(12) United States Patent
Nakajima et al.

(10) Patent No.: US 8,421,405 B2
(45) Date of Patent: Apr. 16, 2013

(54) CHARGE SYSTEM, MOBILE ELECTRONIC DEVICE, CELL TERMINAL USED FOR THEM, AND SECONDARY CELL

(75) Inventors: Masayoshi Nakajima, Kanagawa (JP); Akira Koyama, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 507 days.

(21) Appl. No.: 12/663,835

(22) PCT Filed: Jun. 13, 2008

(86) PCT No.: PCT/JP2008/060871
§ 371 (c)(1),
(2), (4) Date: Jan. 28, 2010

(87) PCT Pub. No.: WO2008/153138
PCT Pub. Date: Dec. 18, 2008

(65) Prior Publication Data
US 2010/0171460 A1   Jul. 8, 2010

(30) Foreign Application Priority Data

Jun. 13, 2007 (JP) .................................. 2007-156656

(51) Int. Cl.
*H02J 7/00* (2006.01)
*G08B 5/22* (2006.01)
*G08B 21/00* (2006.01)

(52) U.S. Cl.
USPC ........... 320/106; 320/110; 320/125; 320/128; 320/138; 340/7.32; 340/636.1; 340/636.12; 340/636.13; 340/636.15; 340/636.18; 340/636.19; 340/636.2; 340/636.21

(58) Field of Classification Search .................. 320/106, 320/110, 125, 128, 138; 340/7.32, 636.1, 340/636.12, 636.13, 636.15, 636.18, 636.19, 340/636.2, 636.21; 455/343
See application file for complete search history.

(56) References Cited

U.S. PATENT DOCUMENTS

| | | | |
|---|---|---|---|
| 5,717,307 A * | 2/1998 | Barkat et al. | 340/636.1 |
| 6,021,332 A * | 2/2000 | Alberth et al. | 455/552.1 |
| 6,268,710 B1 * | 7/2001 | Koga | 320/116 |
| 6,861,821 B2 | 3/2005 | Masumoto et al. | |
| 7,679,315 B2 * | 3/2010 | Kim et al. | 320/106 |

(Continued)

FOREIGN PATENT DOCUMENTS

| JP | 5-135804 | 6/1993 |
|---|---|---|
| JP | 2003-086159 | 3/2003 |

(Continued)

OTHER PUBLICATIONS

Notice of Reasons for Rejection dated May 8, 2012, issued in counterpart Japanese Application No. 2009-519321.

*Primary Examiner* — Drew A Dunn
*Assistant Examiner* — Steve T Chung
(74) *Attorney, Agent, or Firm* — Procopio, Cory, Hargreaves & Savitch LLP (57) ABSTRACT

It is possible to prevent charge of an incompatible secondary cell while suppressing the size of a mobile electronic device and a secondary cell without increasing power consumption so as to prevent damage of the secondary cell or the mobile electronic device by charge. A detachable secondary cell (30) supplies power to a mobile electronic device (2). The mobile electronic device (2) includes: a cell terminal (60) which outputs and inputs power to/from the mounted secondary cell (30); non-contact information extraction means (20) which performs a magnetic field communication; a loop antenna (26) which transmits/receives a signal using an electromagnetic wave by the non-contact information extraction means (20); and control means (22) which acquires particular information outputted from the non-contact information extraction means (20) and controls charge of the secondary cell (30) according to the acquired particular information. The loop antenna (26) is arranged in the cell terminal (60).

11 Claims, 10 Drawing Sheets

U.S. PATENT DOCUMENTS

| | | |
|---|---|---|
| 2003/0102842 A1 | 6/2003 | Tamai et al. |
| 2003/0162083 A1* | 8/2003 | Sakuma et al. ................. 429/61 |
| 2006/0263647 A1 | 11/2006 | Moon et al. |
| 2008/0048876 A1* | 2/2008 | Miyajima et al. .......... 340/636.1 |
| 2009/0015194 A1* | 1/2009 | Cargin et al. ................. 320/106 |

FOREIGN PATENT DOCUMENTS

| | | |
|---|---|---|
| JP | 2003-168406 | 6/2003 |
| JP | 2003-257497 | 9/2003 |
| JP | 2005-285567 | 10/2005 |
| JP | 2005-341775 | 12/2005 |
| JP | 2006-164820 | 6/2006 |
| JP | 2006-228490 | 8/2006 |
| JP | 2006-236806 | 9/2006 |
| WO | 2006/112627 | 10/2006 |

* cited by examiner

TABLE OF CORRESPONDENCE FOR SECONDARY BATTERY PACKS

| MAKER | MODEL | ID INFORMATION ON A SECONDARY BATTERY PACK | TYPE | CAPACITY |
|---|---|---|---|---|
| A COMPANY | AA1 | OOOOOO | NICKEL CADMIUM | SMALL |
| | | OOOOOO | LITHIUM ION | MEDIUM |
| | | OOOOOO | NICKEL HYDROGEN | LARGE |
| | | ⋮ | ⋮ | ⋮ |
| | | OOOOOO | LITHIUM ION | LARGE |
| | | OOOOOO | LITHIUM POLYMER | LARGE |
| A COMPANY | AA2 | OOOOOO | NICKEL CADMIUM | MEDIUM |
| | | OOOOOO | LITHIUM ION | LARGE |
| | | ⋮ | ⋮ | ⋮ |
| | | OOOOOO | NICKEL HYDROGEN | LARGE |
| | | OOOOOO | NICKEL HYDROGEN | LARGE |
| B COMPANY | bb-15 | OOOOOO | LITHIUM ION | MEDIUM |
| | | OOOOOO | LITHIUM ION | LARGE |
| | | ⋮ | ⋮ | ⋮ |
| | | OOOOOO | NICKEL CADMIUM | SMALL |
| | | OOOOOO | NICKEL HYDROGEN | LARGE |
| C COMPANY | C34s | OOOOOO | NICKEL CADMIUM | SMALL |

CHARGE SYSTEM, MOBILE ELECTRONIC DEVICE, CELL TERMINAL USED FOR THEM, AND SECONDARY CELL

TECHNICAL FIELD

This invention relates to a charge system that is connectable to a charging device and in which a secondary battery is attachably and detachably installed and when a mobile electronic device is connected with the charging device while the second battery is installed therein, electric power is automatically supplied from the charging device to the secondary battery, and mobile electronic device, and a battery terminal used for the mobile electronic device, and the secondary battery.

BACKGROUND ART

For a conventional mobile electronic device such as a cellar phone, a secondary battery is adapted to be attachably and detachably installed, which is connectable to a predetermined charging device and compatible with the mobile electronic device. There has been a device belonging to such a mobile electronic device, which includes an electric power circuit that automatically starts electric power supply from a charging device to a secondary battery, when the mobile electronic device installed with the secondary battery is connected with the charging device.

There is a case where a secondary battery other than the secondary battery that is purchased at the time of purchasing a cellar phone is purchased additionally for the purpose of exchanging the secondary batteries. If a battery that is not a regular one, and which is an imitation or accidentally has the same terminal arrangement as the regular battery is installed in a mobile electronic device, it may be that normal charge control can not be performed. Accordingly, a technique is disclosed in patent documents 1 and 2, which employs an information communication chip mounted on a secondary battery that performs magnetic field communication with a mobile electronic device so as to perform the authentication of the model of the secondary battery.

Patent document 1: Japanese Unexamined Patent Application Publication 2005-285567
Patent document 2: Japanese Unexamined Patent Application Publication 2005-341775

DISCLOSURE OF THE INVENTION

Problems to be Solved by the Invention

Most secondary batteries include magnetic materials such as aluminum and iron. Accordingly, for the mobile electronic devices disclosed in the patent documents 1 and 2, it is necessary to consider the transmission and reception characteristics that take account of the noise due to the magnetism of the secondary battery etc. This has required an increase in the output of transmission and reception, resulting in an increase in the power consumption, or an increase in the dimension of the mobile electronic device or the secondary battery so as to accommodate a larger antenna.

In view of the drawbacks described above, the object of this invention is to provide the charge system that can guarantee the safe usage by verifying whether a regular secondary battery is installed, while not only preventing the power consumption from increasing, but also maintaining the small dimension of the mobile electronic device or the secondary battery, and the mobile electronic device, the battery terminal used for the mobile electronic device, and the secondary battery.

Means for Solving the Problems

In the first aspect of the present invention, a charge system is provided in order to achieve the object described above, which comprises: a secondary battery attachably and detachably installed; a mobile electronic device to which electric power is supplied by the secondary battery; and a charging device charging the secondary battery via the mobile electronic device. The secondary battery comprises: a battery cell accumulating electric power; an electrode connected to the battery cell; and non-contact output means capable of outputting specific information by magnetic field communication. The mobile electronic device comprises: a battery terminal transferring electric power with the electrode of the secondary battery; non-contact means for extracting information that performs magnetic field communication with the non-contact output means; and a control means that acquires the specific information outputted by the non-contact means for extracting information and controls charging of the secondary battery based on the acquired specific information while the charging device is connected with the mobile electronic device. The non-contact means for extracting information has a loop antenna for performing transmission and reception of signals through electromagnetic waves, and the loop antenna is placed within the battery terminal. The electrode is fixed at an end portion of the battery cell, and the non-contact output means is fixed at the end portion of the battery cell at which the electrode is fixed.

In the second aspect of the present invention, a mobile electronic device is provided, which is supplied with electric power by a secondary battery attachably and detachably installed. The mobile electronic device comprises: a battery terminal transferring electric power with the installed secondary battery; non-contact means for extracting information performing magnetic field communication; a loop antenna with which the non-contact means for extracting information performs transmission and reception of signals through electromagnetic waves; and control means for acquiring specific information outputted by the non-contact means for extracting information and controlling charging of the secondary battery based on the acquired specific information. The loop antenna is placed within the battery terminal.

In addition in the second aspect of the present invention, it may be preferable that the battery terminal comprises a plurality of terminals abutting electrodes of the secondary battery and a main body that holds the plurality of terminals to be urged in a predetermined direction, and the loop antenna is fixed to the main body such that an axial direction of winding of the loop antenna is in parallel with the predetermined direction.

In the third aspect of the present invention, a battery terminal is provided, which is installed inside a mobile electronic device that is supplied with electric power by a secondary battery attachably and detachably installed. The battery terminal comprises a plurality of terminals abutting electrodes of the secondary battery installed in the mobile electronic device, a main body holding the plurality of terminals to be urged in a predetermined direction and a loop antenna for performing magnetic field communication with the secondary battery installed in the mobile electronic device. The loop antenna is fixed to the main body such that an axial direction of winding of the loop antenna is in parallel with the predetermined direction.

In addition in the third aspect of the present invention, it may be preferable: the battery terminal further comprises a plurality of mounting pins that has electric continuity with each of the plurality of terminals and is used for soldering with a circuit board; one of the plurality of terminals is used as a negative terminal on which a negative electrode of the secondary battery installed in the mobile electronic device abuts; and a cold end of the loop antenna is further connected to a mounting pin of the plurality of mounting pins to which the negative terminal is connected.

In the fourth aspect of the present invention, a secondary battery is provided, which supplies electric power while installed in a mobile electronic device that comprises a non-contact means for extracting information that performs magnetic field communication. The secondary battery comprises a battery cell accumulating electric power, a positive terminal and a negative terminal connected to the battery cell, storage means storing information related to particularly identifying the secondary battery and non-contact output means capable of outputting the information stored in the storage means. The non-contact output means comprises a loop antenna for performing magnetic field communication. The positive terminal and the negative terminal are fixed to the battery cell so as to be exposed at a predetermined surface of the battery cell. The non-contact output means and the storage means are fixed to the battery cell such that an axial direction of winding of the loop antenna is perpendicular to the predetermined surface.

In addition in the fourth aspect of the present invention, it may be preferable that a magnetic sheet is interposed between the non-contact output means and the battery cell.

In addition in the fourth aspect of the present invention, it may be preferable that the secondary battery further comprises protection means that is interposed between the battery cell and the positive terminal and the negative terminal so as to protect the battery cell from an over current, and the positive terminal, the negative terminal, the non-contact output means and the storage means are integrally fixed to the battery cell by resin molding.

Furthermore, in the fourth aspect of the present invention, it may be preferable that the non-contact output means and the storage means are fixed to the battery cell by adhesion with a seal for detecting a water content.

Effects of the Invention

The present invention can provide: a charge system that can verify whether a proper secondary battery is installed, while not only preventing an increase in the consumption of electric power as much as possible, but also restraining the sizes of the secondary battery and a mobile electronic device; the mobile electronic device; a battery terminal used for the mobile electronic device; and the secondary battery.

PREFERRED MODE FOR CARRYING OUT THE INVENTION

A detailed description is given of an embodiment of a mobile electronic device and a secondary battery according to the present invention with reference to the drawings.

FIGS. 1-12 are drawings that are referenced so as to describe a cellar phone 2 (an example of the mobile electronic device), a battery terminal 60 provided inside the cellar phone 2 and a secondary battery 30 installed in the cellar phone 2.

Figure 1:
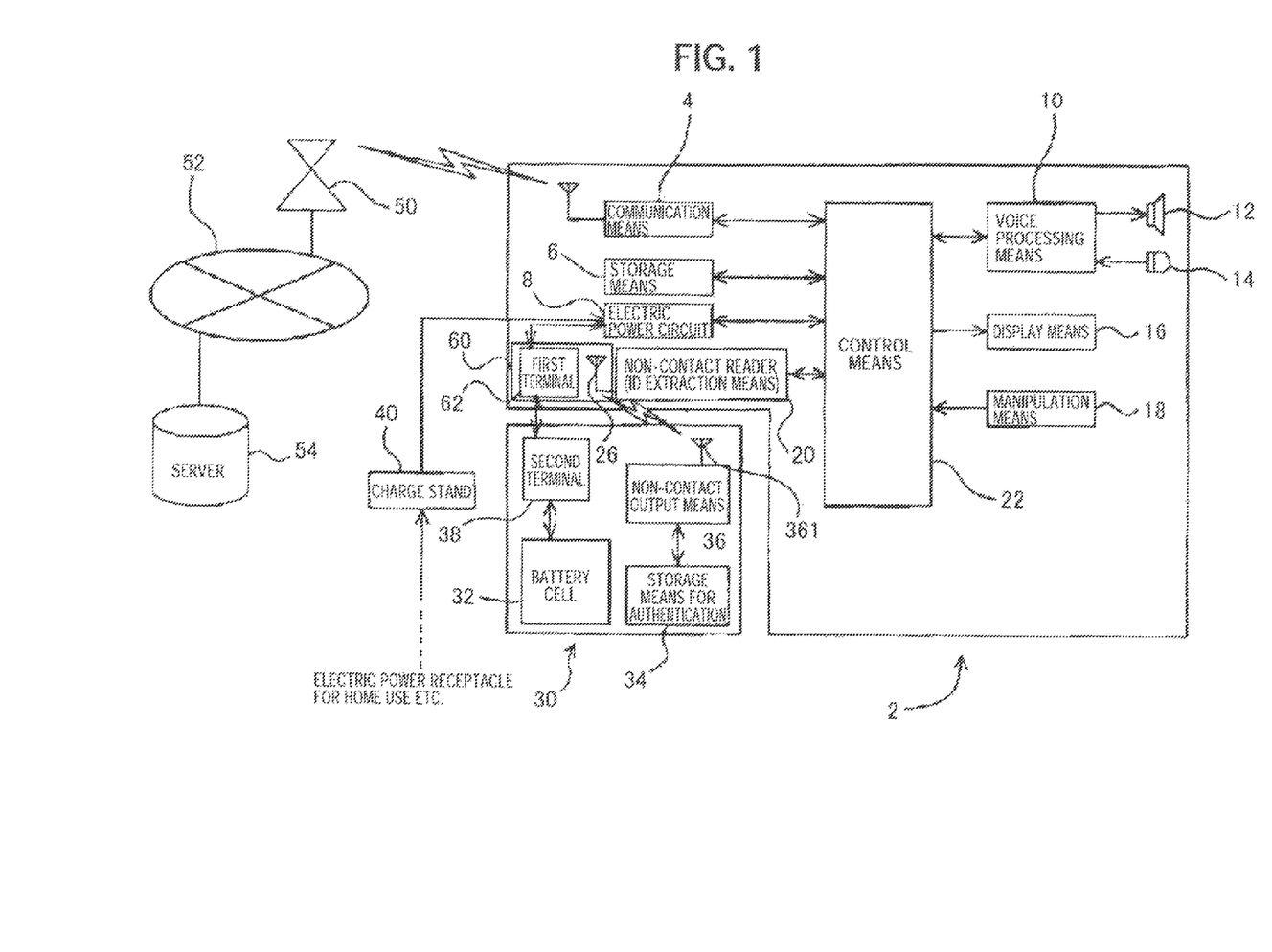
FIG. 1 is a block diagram showing a circuit architecture associated with a cellar phone 2, secondary battery 30 and charge stand 40, and a communication network 52 according to an embodiment of the present invention.

FIG. 1 is a block diagram illustrating a circuit architecture for the cellar phone 2 installed with the secondary battery 30. The cellar phone 2 includes communication means 4, storage means 6, electric power circuit 8, voice processing means 10, speaker 12, microphone 14, display means 16, manipulation means 18, battery terminal 60, non-contact reader 20 (corresponding to an ID extraction means) and control means 22 that controls these components. The battery terminal 60 is provided with an RFID antenna 26 that is connected with a first terminal 62 and the non-contact reader 20 (corresponding to ID extracting means) and control means 22 controlling these components. The battery terminal 60 includes the first terminal 62 and the RFID antenna 26 connected with the non-contact reader 20. Further, the secondary battery 30 is provided with a secondary cell (battery cell) 32, storage means for authentication 34, non-contact output means 36 and a second terminal 38.

When the secondary battery 30 is installed in the cellar phone 2, the battery cell 32 of the secondary battery 30 is circuitally connected through the electric power circuit 8, the first terminal 62 and the second terminal 38 in contact with the first terminal 62. The cellar phone 2 is adapted to receive the power from the battery cell 32 of the secondary battery 30 installed in the cellar phone 2 via the electric power circuit 8 when the cellar phone 2 is in a normal operation.

In addition, when the cellar phone 2 is placed on a charge stand 40 (corresponding to a charging device) compatible with the cellar phone 2, the cellar phone 2 is electrically connected with the charge stand 40 through the contact of corresponding terminals between the electric power circuit 8 and the charge stand 40. In this manner, the battery cell 32 of the secondary battery 30 is electrically charged.

Although it is not graphically described, a charge circuit that circuitally connects the charge stand 40 and the battery cell 32 of the secondary battery 30 is formed in a part of the electric power circuit 8. The electric power circuit 8 is adapted to switch ON/OFF of the power supply performed by the charge circuit from the charge stand 40 to the secondary battery 30 according to an instruction from the control means 22.

Figure 2:
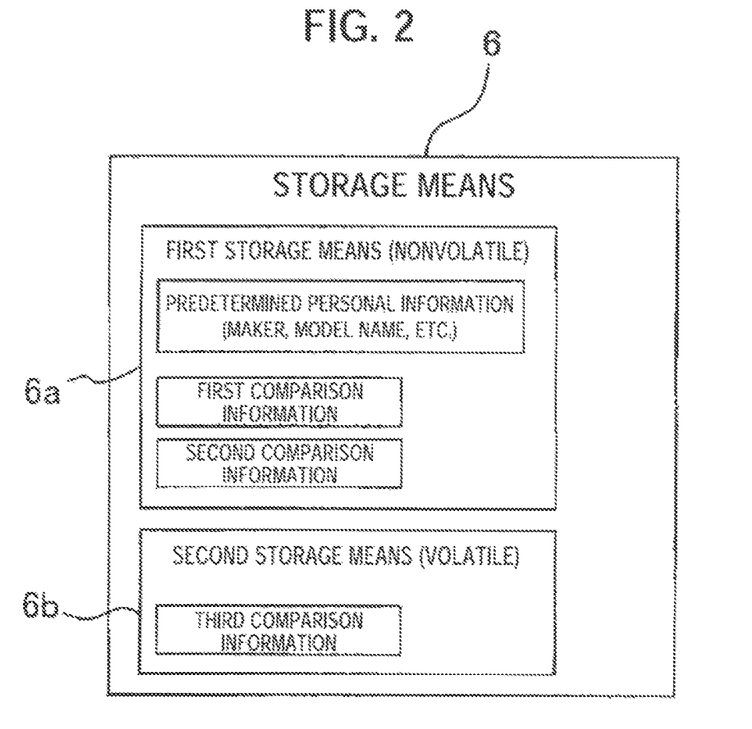
FIG. 2 is a diagram illustrating an internal architecture of storage means 6 shown in FIG. 1.

As shown in FIG. 2, the storage means 6 is provided with nonvolatile first storage means 6a and volatile second storage means 6b. In the first storage means 6a, predetermined personal information, first comparison information and second comparison information each serving as information for comparison are stored. In the second storage means 6b, third comparison information serving as information for comparison is stored.

The first storage means 6a stores maker and model names associated with the cellar phone 2 as the personal predetermined information. In addition, the first storage means 6a stores information to be compared with the ID information of the secondary battery 30, which will be described later, as the first comparison information. In this manner, the first storage means 6a stores in advance contents related to the ID information of one secondary battery 30 among a plurality of secondary batteries 30 that is compatible with the cellar phone 2.

As similar to the first comparison information, the second comparison information stored in the first storage means 6a contains information to be compared with the ID information related to the secondary battery 30. Namely, contents related to another secondary battery 30 among the plurality of secondary batteries 30 compatible with the cellar phone 2 are in advance stored as the second comparison information. The first comparison information and the second comparison information are adapted to include the contents of the ID information related to the secondary batteries 30 differing from each other. In this manner, the contents of the first comparison data and the second comparison data differ from each other.

Accordingly, the cellar phone 2 has the following information stored in the first storage means 6a at the delivery of the cellar phone 2 to a user after the shipping from a factory. More specifically, the first storage means 6a has the same comparison information as the ID information (specific information) possessed by particular two secondary batteries 30 compatible with the cellar phone 2 as the first and the second comparison information. Since the first storage means 6a is nonvolatile, the first comparison information and the second comparison information can be continuously retained even if the power supply to the first storage means 6a is discontinued, and they are protected from being rewritten into different contents.

The third comparison information stored in the second storage means 6b is information to be compared with the ID information related to the secondary battery 30, which will be described later, similar to the first comparison information and the second comparison information stored in the first storage means 6a. However, the third comparison information is different from the first comparison information and the second comparison information. As the third comparison information, it is possible to write ID information related to any one of the plurality of secondary batteries 30 compatible with the cellar phone 2 into the second storage means 6b.

In this manner, the third comparison information is information that is correlated with a secondary battery 30 differing from the secondary battery 30 that possesses the ID information consistent with the first comparison information. Similarly, the secondary battery 30 possessing the ID information consistent with the third comparison information is different from a secondary battery 30 possessing the ID information consistent with the second comparison information. The contents of the ID information are updated according to the secondary battery 30 possessing the ID information consistent with the third comparison information. In addition, since the second storage means 6b is volatile, the third comparison information is deleted if the power supply to the second storage means 6b is discontinued.

As shown in FIG. 1, in the secondary battery 30 the storage means for authentication 34 and the non-contact output means 36 are connected with each other. In the storage means for authentication 34, a data specific to a particular secondary battery 30 is stored, which differs among secondary batteries 30 from one to another. More specifically, the storage means for authentication 34 has a data area interposed between a start bit and a stop bit. The storage means for authentication 34 is adapted to make the read only architecture that is capable of storing a serial data including a parity bit for correcting an error. In the data area, ID information (the manufacturing number of a secondary battery 30 etc.), information related to the type of a battery (lithium ion, nickel hydrogen, or nickel cadmium, etc.), and the identification of a maker and the value of capacity, etc. are stored in serial rows.

The non-contact reader 20 of the cellar phone 2 performs non-contact (wireless) communication with the non-contact output means 36 via the RFID antenna 26 utilizing an RFID (Radio Frequency Identification) technique. In this manner, the non-contact reader 20 is able to read the specific information such as the ID information etc. stored in the storage means for authentication 34 of the secondary battery 30.

Even if the secondary battery 30 is installed in the cellar phone 2, the non-contact reader 20 and the non-contact output means 36 are not directly connected with each other electrically. However, when the connection between the cellar phone 2 and the secondary battery 30 is detected, the non-contact reader 20 starts to wirelessly transmit an instruction for authentication in response to the instruction sent from the control means 22. The non-contact output means 36 generates the operation power, receiving the instruction for authentication sent from the non-contact reader 20, reads out the ID information stored in the storage means for authentication 34 using the generated operation power as a power source, and wirelessly outputs the ID information to the non-contact reader 20. In this manner, the non-contact output means 36 can operate without receiving the power supply from the battery cell 32 in the secondary battery 30.

In addition, the communication means 4 of the cellar phone 2 is adapted to connect with a public communication network 52 via a neighboring base station 50, using a wireless communication method such as CDMA2000_1x. A server 54 is connected with the communication network 52. The server 54 stores a table of correspondence for secondary batteries that indicates the compatibility between the cellar phone 2 and the secondary battery 30.

Figure 3:
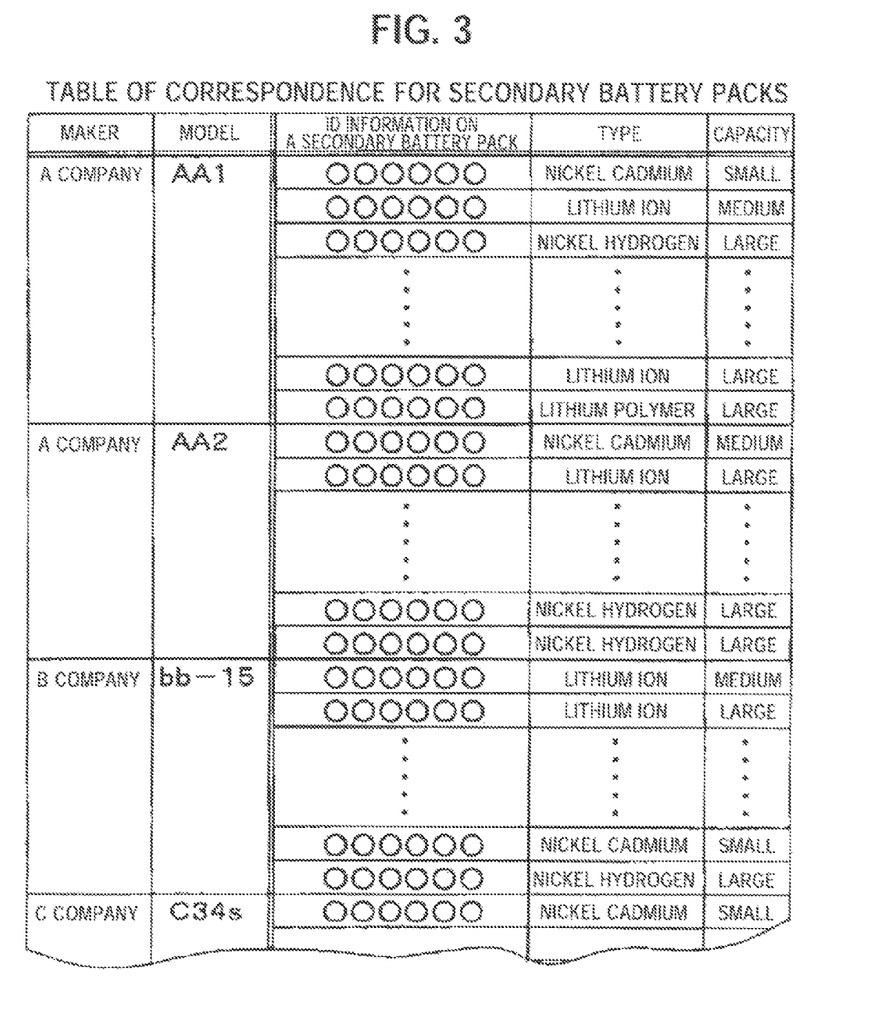
FIG. 3 shows a table of correspondence for second batteries stored in a server 54 shown in FIG. 1.

As shown in FIG. 3, the maker and model names of a cellar phone 2 and the ID information related to secondary batteries 30 compatibly mounted on the cellar phone 2 are recorded in advance on the table of correspondence for secondary batteries, which is stored in the server 54.

Figure 12:
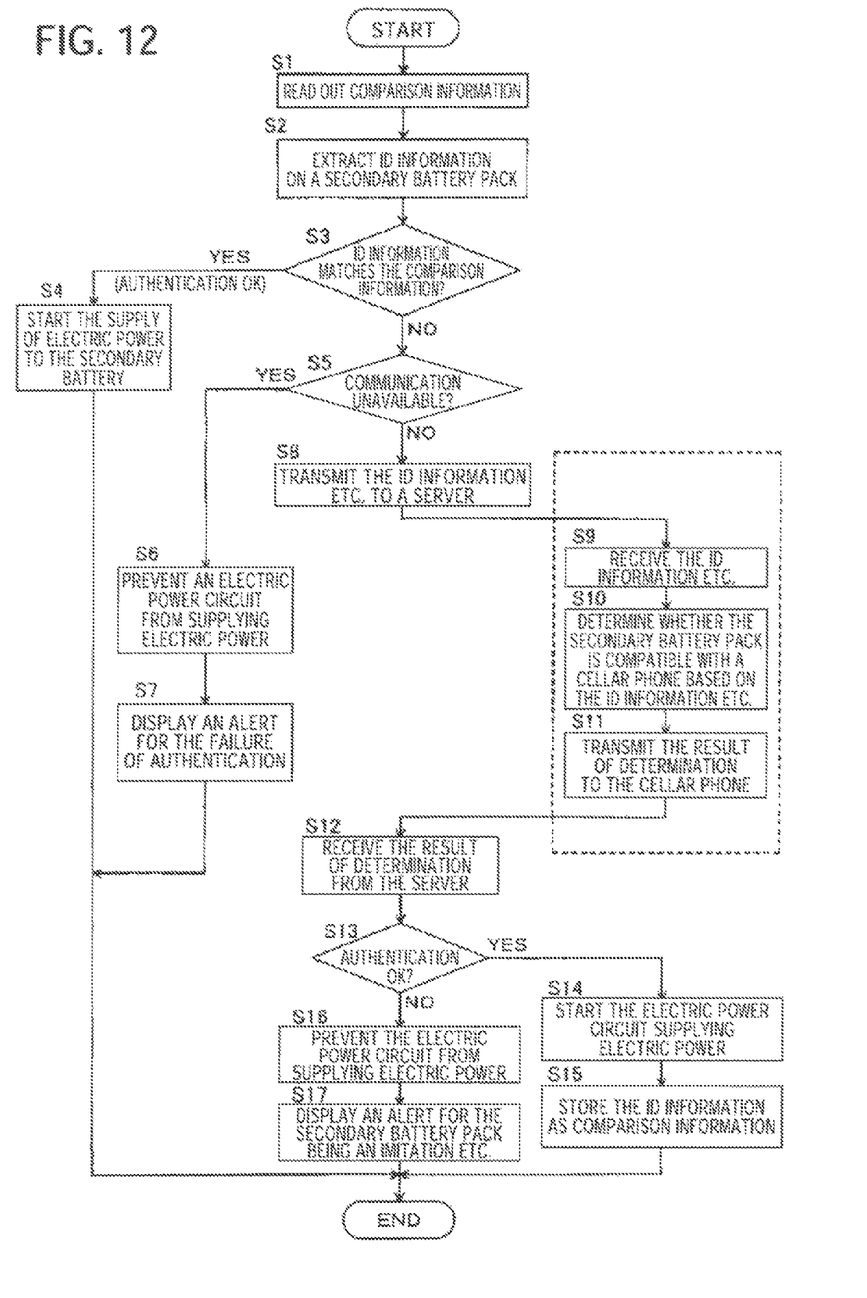
FIG. 12 is a flow chart describing authentication processing performed by control means 22 when the cellar phone 2 shown in FIG. 1 is connected with the charge stand 40.

Next a description is given of the operation of the cellar phone 2 when the secondary battery 30 is removed from the cellar phone 2. As will be described later, there is a case where the ID information of the secondary battery 30 that is currently installed in the cellar phone 2 is stored as the third comparison information, according to processing in step S15 of the flow chart as shown in FIG. 12, in the second storage means 6b of the cellar phone 2 (see FIG. 2).

In this case, since the second storage means 6b is volatile, the power supply to the second storage means 6b is discontinued when the secondary battery 30 is removed from the cellar phone 2. Accordingly, the third comparison information stored in the second storage means 6b is deleted.

Figure 4:
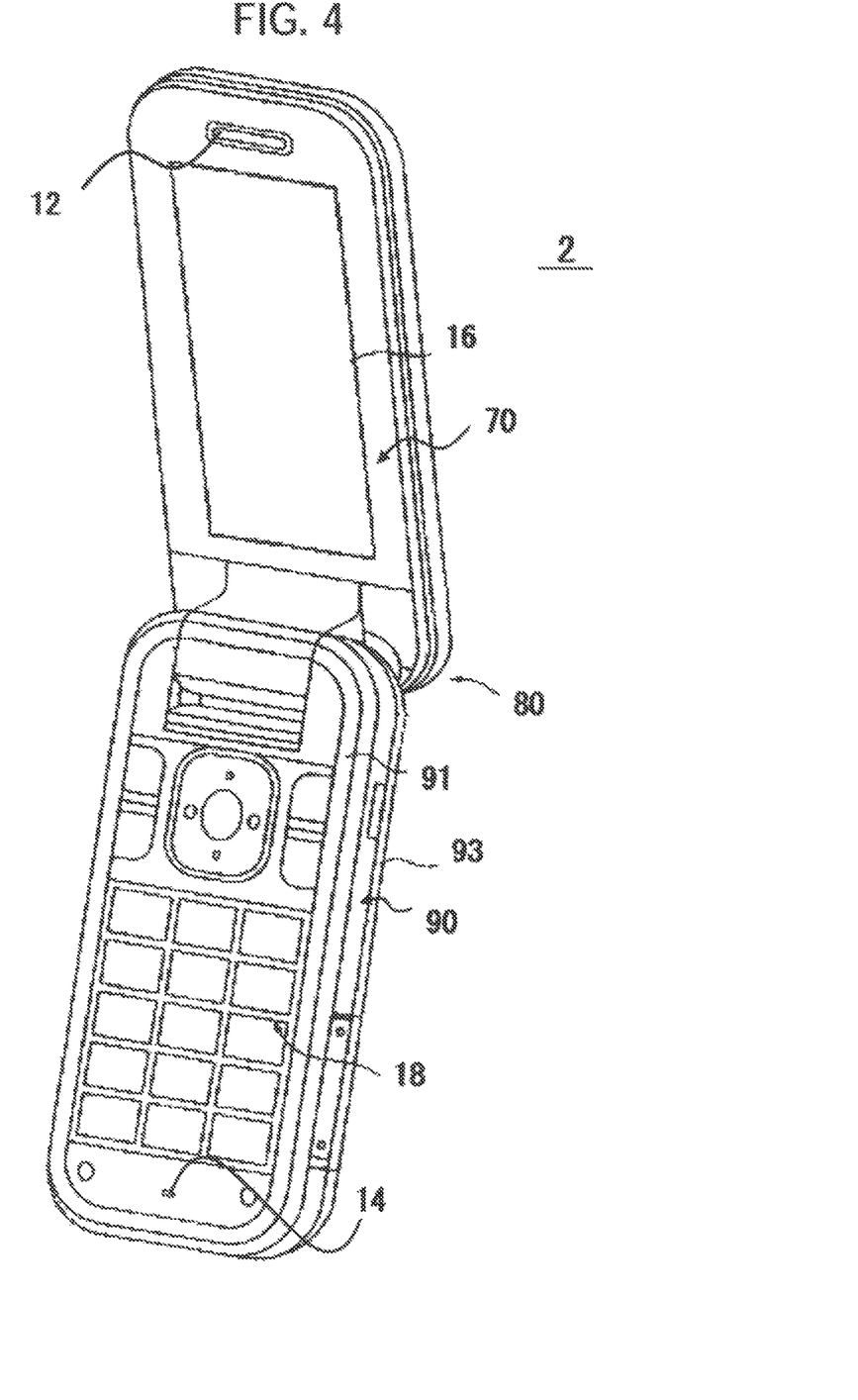
FIG. 4 is an external perspective view illustrating the cellar phone 2 to which the present invention is applied.

Next a structural description is given of an embodiment of the present invention with reference to FIGS. 4-12. FIG. 4 is a perspective view illustrating the external view of the cellar phone 2 in an open position. The cellar phone 2 is configured to be a so-called foldable cellar phone. The cellar phone 2 is provided with a reception housing 70 and a transmission housing 90, which are pivotably connected with each other between an open position and a closed position.

The reception housing 70 and the transmission housing 90 are connected with each other at end portions thereof by a connection member 80 that serves as a center for the pivotal movement. The reception housing 70 and the transmission housing 90 are each generally configured to be a thin rectangular parallelepiped, and their contours substantially coincide with each other when they are stacked with each other in the closed position. The connection member 80 is formed in such a manner that a convex portion formed in the reception housing 70 mates with a concave portion formed in the transmission housing 90.

The transmission housing 90 is provided with the microphone 14 for telephone calls, a built-in antenna (not shown) connected with the communication means 4, and the manipulation means 18 that accepts the manipulation made by a user. The reception housing 70 is provided with, for example, the speaker 12 for telephone calls and a main display unit (display means) 16. On the backside of the reception housing 70, a speaker for notification, sub-display unit and camera are provided, graphical descriptions of which are omitted.

The transmission housing 90 is provided with a front case 91 that lies on a side facing the reception housing 70 in a closed position, a rear case 93 that lies on the opposite side, and a cover (not shown) that is attached to the backside of the rear case 93. The front case 91, rear case 93 and the cover are parts of the housing, respectively, each of which is made of electrically nonconductive plastic. The front case 91 and rear case 93 are fixed together by a screw, for example, which is inserted through one of the cases and fastened with a screw boss provided at the other one of the cases.

Figure 5:
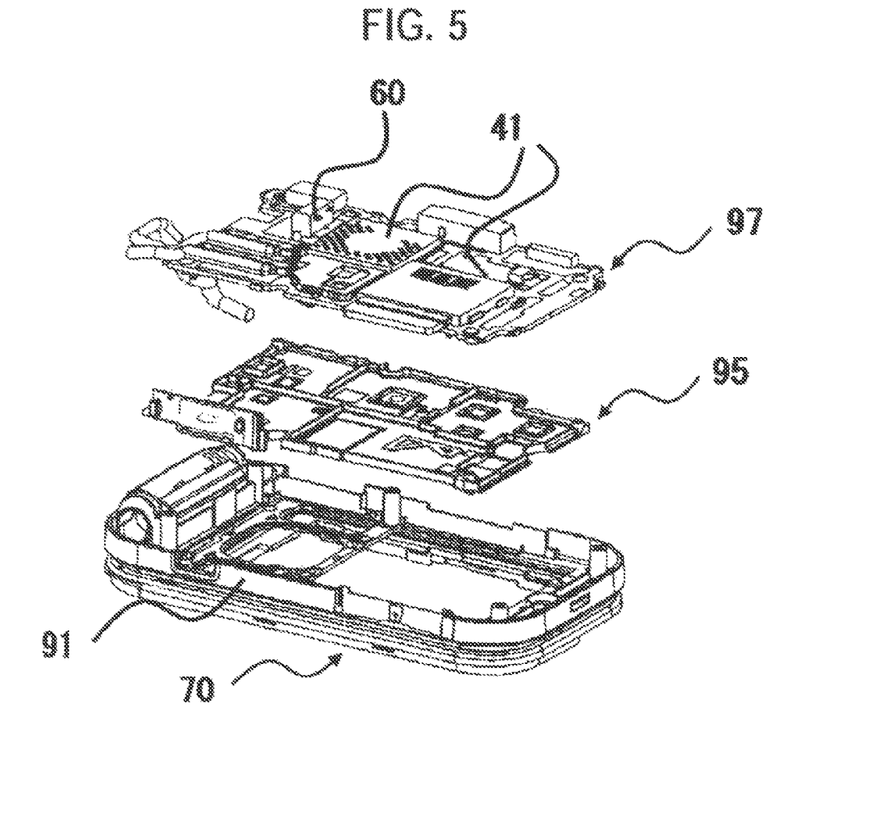
FIG. 5 is an exploded perspective view illustrating the cellar phone 2 shown in FIG. 4.

As will be described later, a shield case 95 is placed between the front case 91 and the rear case 93. On the shield case 95 are placed a key sheet on which various keys of the manipulation means 18 are arranged and a flexible printed circuit (FPC) on which a plurality of push switches corresponding to the various keys is disposed. In addition, a circuit board 97 is placed between the front case 91 and the rear case 93. The secondary battery 30 is installed between the rear case 93 and the cover.

FIG. 5 depicts the reception housing 70 with some of the members such as the rear case 93 not being attached. In FIG. 5, the shield case 95 and the circuit board 97 are removed from the front case 91. In addition, the circuit board 97 of the transmission housing 90 and a display board (not shown) of the reception housing 70 are electrically connected with each other by a cable.

A circuit pattern is formed on a mounting surface of the circuit board 97. On the mounting surface of the circuit board 97 an electronic circuit is formed by various electronic parts 41 that are driven by the electric power supplied by the secondary battery 30. For example, the electric power circuit 8 and the control means 22 that controls the main display unit (display means) 16 etc. according to signals sent from the communication means 4 and the manipulation means 18 are formed or mounted on the circuit board 97. In addition, the battery terminal 60, as will be described later, is mounted on the mounting surface of the circuit board 97.

Figure 6:
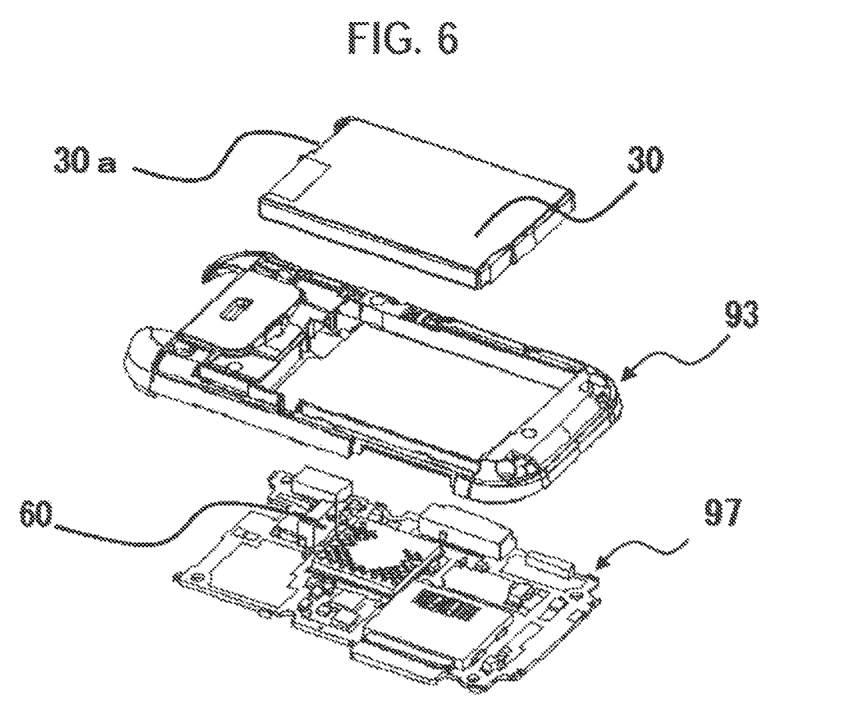
FIG. 6 an exploded perspective view illustrating the cellar phone 2 shown in FIG. 2, as viewed in a different angle.

As shown in FIG. 6, a battery seating portion A of a concave shape is formed in the rear case 93 on the external side of the housing. An aperture 93a is formed at an end of the battery seating portion A. The rear case 93 is attached to the front case 91 such that the battery terminal 60 protrudes through the aperture 93a. The secondary battery 30 is installed in the battery seating portion A.

Figure 7A:
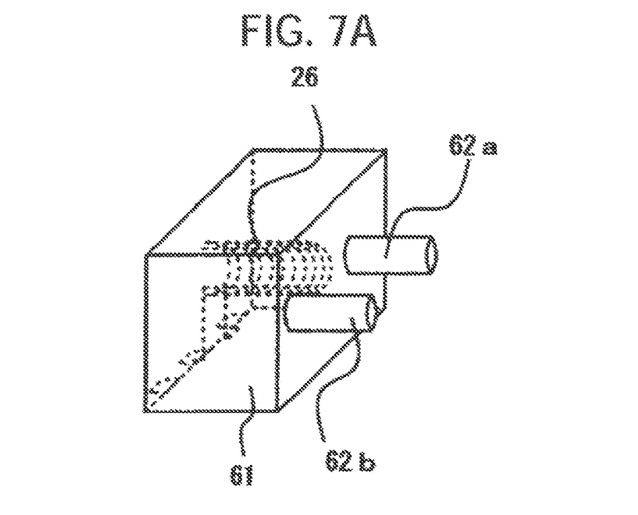
FIG. 7A is perspective view illustrating a battery terminal 60.
Figure 7B:
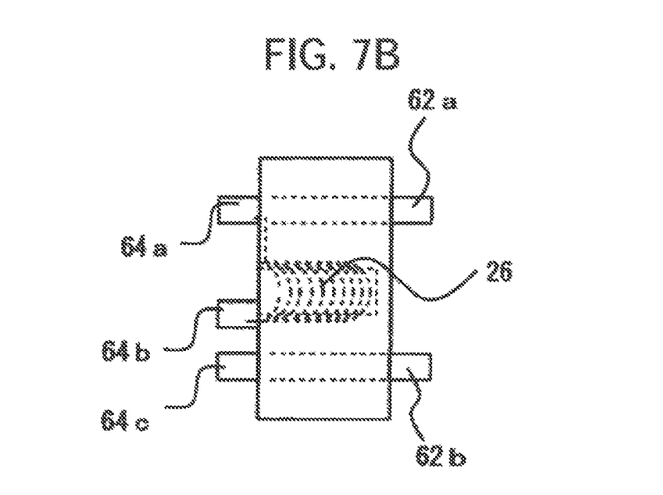
FIG. 7B is a diagram illustrating the battery terminal 60 as viewed overhead.
Figure 7C:
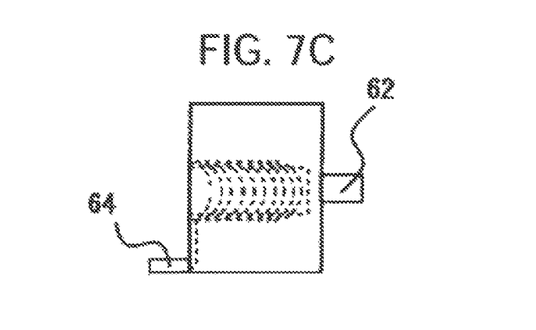
FIG. 7C is a diagram illustrating the battery terminal 60 as viewed from sideways.

As shown in FIGS. 7A-7C, the battery terminal 60 includes a main body 61 made of insulation material such as plastics, a plurality of first terminals 62 and a mounting pin 64 (not shown). FIG. 7A is a perspective view of the battery terminal 60, FIG. 7B is a diagram of the battery terminal 60 as viewed from overhead, and FIG. 7C is a diagram of the battery terminal 60 as viewed from sideways.

Each of the plurality of first terminals 62 protrudes from the main body 61 of the battery terminal 60. In addition, each of the plurality of first terminals 62 is made of a cylindrical or rod-like metallic body, for example. Each of the plurality of the first terminals 62 is provided with the resilience capable of extending and contracting in a direction of sinking into the main body 61 by way of a resilient body such as a spring. In addition, it is configured that the direction of a first terminal 62 extending and contracting and the axial direction of the RFID antenna 26 (a direction of excellent directivity as a loop antenna) substantially coincide with each other.

A cylindrical space is formed inside the main body 61. A cylindrical boss is formed inside the main body, too. The cylindrical boss is coaxial with the center axis of a cylinder that defines the cylindrical space, and has a radius slightly smaller than the cylindrical space. The RFID antenna 26 is installed inside the cylindrical space and inserted in the main body 61. The RFID antenna 26 comprises a loop antenna, which is a metallic wire wound onto the cylindrical boss.

The mounting pin 64 includes mounting pins 64a and 64c for which the electrical continuity with each of the first terminals 62a and 62b is established, and a mounting pin 64b for which the electrical continuity of the hot end of the RFID antenna 26 is established. In addition, the mounting pin 64a is a grounding terminal to which the negative side of the first terminal 62a and the cold end of the RFID antenna 26 are both connected. This results in a decrease in the number of mounting pins. The battery terminal 60 is fixed by soldering with a corresponding land pad in the circuit pattern of the circuit board 97. In this manner, the plurality of mounting pins 64 has electrical continuity with the electric power circuit 8 in the circuit pattern of the circuit board 97. The battery terminal 60 is mounted perpendicularly with respect to the mounting surface of the circuit board 97.

Figure 8:
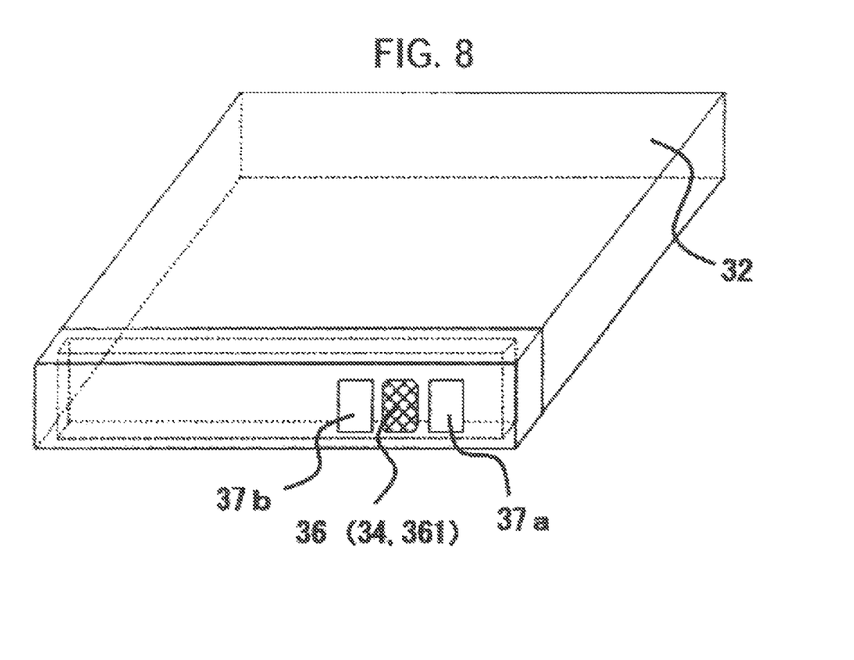
FIG. 8 is a perspective view illustrating the secondary battery 30 to which the present invention is applied.
Figure 9:
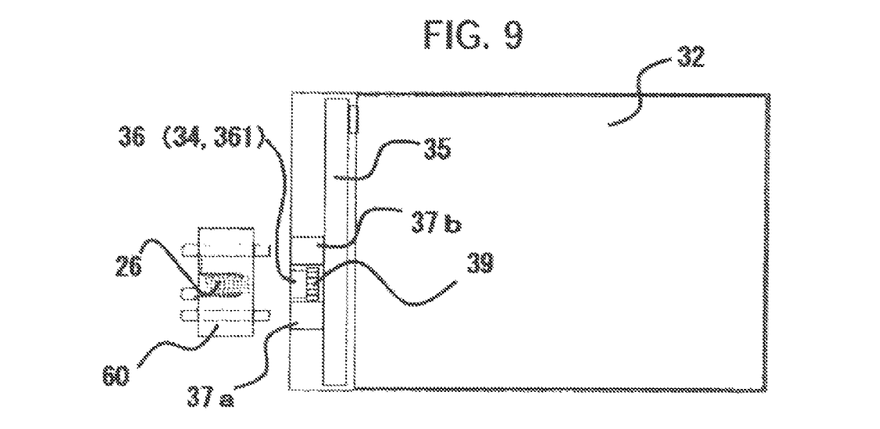
FIG. 9 is a diagram illustrating the correlation between the secondary battery 30 and the battery terminal 60.

Next a description is given of the architecture of the secondary battery 30 according to the present embodiment with reference to FIGS. 8 and 9.

The battery cell 32 occupies most of the volume of the secondary battery 30, and the secondary battery 30 has a second terminal 37 (a positive electrode 37a and negative electrode 37b) so as to supply the electric power to the battery cell. In addition, the positive electrode 37a and the negative electrode 37b of the secondary battery 30 are electrically connected with the battery cell 32 via a protection circuit 35. The protection circuit 35 is formed on a small-sized circuit board. On this small-sized circuit board the positive electrode 37a and the negative electrode 37b are mounted. The positive electrode 37a and the negative electrode 37b are fixed by resin molding, for example, to the battery cell 32, while the small-sized circuit board is disposed on an end surface of the battery cell 32.

The positive electrode 37a and the negative electrode 37b are exposed at the end surface in a longitudinal direction of the secondary battery 30. In addition, between the positive electrode 37a and the negative electrode 37b an RFID chip is placed, in which the non-contact output means 36, the storage means for authentication 34 and a small loop antenna 361 are integrated.

In order to fix the non-contact output means 36 and the storage means for authentication 34 by resin molding, it may be possible to adopt a mounting method in which the non-contact output means 36 and the storage means for authentication 34 are fixed in advance on a small board and this small board is integrated by resin molding. As the resin for molding, a polyamide resin, polyurethane resin or polyolefin resin, which can be molded at low temperatures and low pressures, is preferable. By introducing these resins, the non-contact output means 36, the storage means for authentication 34 and the small board tend to develop resistance to destruction due to the heat and pressure.

Alternatively, it may be possible that the non-contact output means 36 and the storage means for authentication 34 are mounted on the small board after the completion of integration by molding the electrodes and the small board with respect to the battery cell 32. A seal for detecting a water content (a seal with an adhesive for detecting a water content) is generally attached to a surface of the secondary battery 30. The seal for detecting a water content is a sheet used for an inspection in a case of failure occurrence, which changes its color if the water sticks to it. The workability is highly increased if the RFID chip in which the non-contact output means 36 and the storage means for authentication 34 are integrated is attached to the molded resin portion by adhesion when the seal for detecting a water content is attached to the secondary battery 30.

The non-contact output means 36 has the small loop antenna 361. The non-contact output means 36 is fixed to the battery cell 32 such that the directive direction of the small loop antenna 361 substantially matches the longitudinal direction of the secondary battery 30. The small loop antenna 361 is made of a metallic thin wire spirally wound many times. In addition, the axial direction of the wound metallic thin wire substantially coincides with the direction perpendicular to the surface at which the positive electrode 37a and the negative electrode 37b of the secondary battery 30 are exposed.

When the secondary battery 30 is installed in the cellar phone 2, the first terminals 62a and 62b of the battery terminal 60 abut the second terminals 37 (positive electrode 37a and negative electrode 37b) inside the transmission housing 90. Under this occasion (see FIG. 10), the axial direction of the RFID antenna 26 inside the battery terminal 60 is coaxial with the axial direction of the small loop antenna 361 inside the secondary battery 30. In this manner, it is possible to achieve the spatial arrangement to provide the best antenna directivity for the both antennas.

A magnetic sheet 39 including ferrite etc. is placed on the backside (the surface facing the inside of the second battery 30) of the non-contact output means 36. This indicates that the magnetic sheet 39 is interposed between the non-contact output means 36 and the battery cell 32 or the small circuit board. It may be possible that the magnetic sheet 39 is attached beforehand by adhesion to the back surface of the non-contact output means 36 at the time of adhesion of the sheet for detecting a water content. It is possible to reduce the adverse effect caused by the battery cell 32 on the magnetic field communication between the RFID antenna 26 and the small loop antenna 361 by interposing the magnetic sheet 39. In this manner, the quality of communication between these antennas can be increased. In addition, it is possible to perform communication with high accuracy even if the output power is small. In this manner, it is possible to decrease the power consumption required by the cellar phone 2 performing the magnetic field communication. Since the magnetic sheet 39 reduces the adverse effect caused by the battery cell 32, it is possible to render the distance between the battery cell 32 and the small loop antenna 361 to be physically smaller compared with the conventional cases, thereby enabling downsizing of the cellar phone 2.

Since the secondary battery 30 according to the present embodiment has the non-contact output means 36 that is able to output the information related to the battery, the secondary battery 30 provides a lot of conveniences associated with the inventory control. Since the secondary battery 30 has advantages in terms of the inventory control, it is possible to reduce the cost of the product.

Figure 10:
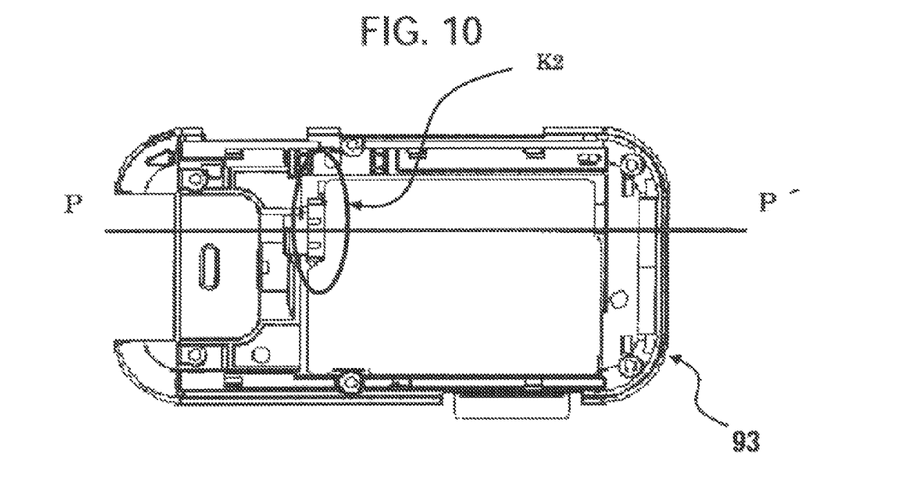
FIG. 10 is a diagram illustrating the correlation between the battery terminal 60 and a rear case 93.
Figure 11:
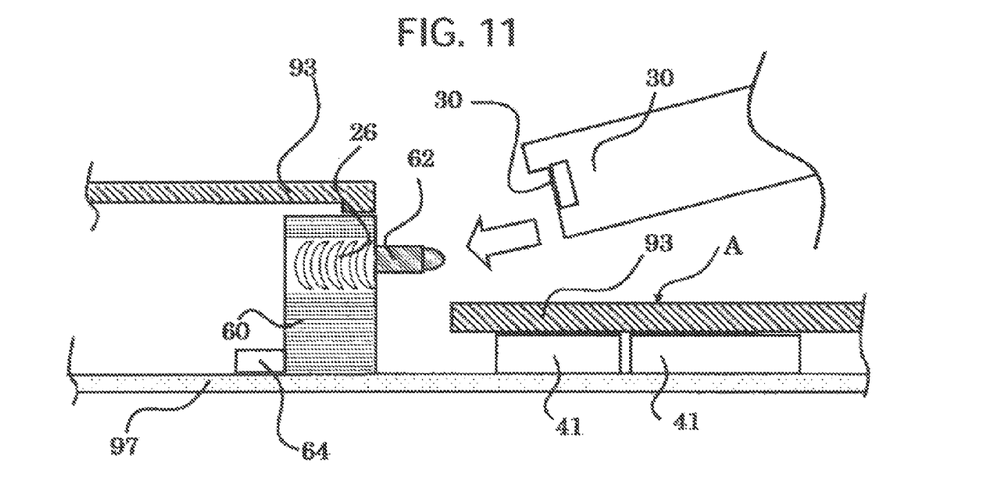
FIG. 11 is a cross sectional view depicting the correlation among the battery terminal 60, rear case 93 and secondary battery 30.

Next a description is given of the installation of the secondary battery 30 into the transmission housing 90 with reference to FIGS. 10 and 11. In this connection, FIG. 11 is a diagram showing a portion of cross section of a region K2 taken along the line P-P' in FIG. 10.

The rear case 93 as a part of the housing has the battery seating portion A having a concave shape, which is formed on the external side of the housing.

As shown in FIG. 11, the protruding direction of the first terminal 62 is substantially perpendicular to the mounting direction of the battery terminal 60. The protruding direction of the first terminal 62 is substantially parallel with the bottom surface of the battery seating portion A and the mounting surface of the circuit board 97.

In addition, the plural first terminals 62 are arranged in a direction that is perpendicular to the direction of protrusion thereof and parallel with the bottom surface of the battery seating portion A.

The secondary battery 30 is installed in the battery seating portion A of the rear case 93 according to the following steps, for example: installing a battery contact point 30a (the positive electrode 37a, negative electrode 37b and non-contact output means 36) provided at one end of the secondary battery 30 into the battery seating portion A so as to abut the first terminal 62; depressing an end opposite to the end at which the battery contact point 30a is provided such that the first terminal 62 sinks into the main body 61; sliding the secondary battery 30 so as to be installed into the battery seating portion A while pressing the opposite end. For this purpose, the direction (sinking direction) of the first terminal 62 protruding from the main body 61 is substantially in parallel with the bottom surface (a plane A) of the battery seating portion A. In addition, the direction of the first terminal 62 protruding from the main body 61 with respect to the battery terminal 60 matches the axial direction of the RFID antenna 26. In this manner, the RFID antenna 26 and the small loop antenna 361 not only lie close to each other, but also their directive directions are substantially coaxial with each other, when the secondary battery 30 is installed in the battery seating portion A.

The secondary battery 30 is installed in the transmission housing 90 such that both the antennas achieve prominent antenna characteristics. This allows both antennas to perform accurate communication while the sharpness Q is maintained high for both antennas, even if the transmission power is decreased. Accordingly, it is possible to restrict the power consumption. In this connection, it is generally known that the sharpness Q is represented by the formula $Q=R(C^{1/2}/L)$.

Next a description is given of one example of authentication performed by the control means 22 according to the present embodiment with reference to the flow chart in FIG. 12. As shown in FIG. 1, the control means 22 starts the authentication shown in the flow chart of FIG. 12 if the cellar phone 2 is placed on the charge stands 40 such that the electric power circuit 8 of the cellar phone 2 is circuitally connected with the charge stand 40.

The control means 22 is adapted to control the electric power circuit 8 such that the control means 22 is supplied with the electric power from the charge stand 40, instead of the battery cell 32 of the secondary battery 30, until the completion of authentication after the electric power circuit 8 is circuitally connected with the charge stand 40.

The control means 22 of the cellar phone 2 is adapted to start authentication to first read out the first comparison information, second comparison information and third comparison information from the storage means 6 (step S1 in FIG. 12). In the authentication, the control means 22 instructs turning on electricity for the RFID antenna 26 through the non-contact reader 20 so as to generate a magnetic field, generating the induced electromotive force on the side of the small loop antenna 361. Subsequently, the authentication is started by driving the non-contact output means 36 with this induced electromotive force. The non-contact reader 20 and the non-contact output means 36 mutually perform the communication authentication by performing transmission and reception of signals with the electromagnetic wave as a carrier between both antennas (RFID antenna 26 and small loop antenna 361). Once the initial communication cession is established, the non-contact reader 20 requires the specific information such as the ID information of the secondary battery 30 from the non-contact output means 36. Subsequently, in response to this requirement, the non-contact output means 36 reads out the ID information from the storage means for authentication 34, allowing the non-contact reader 20 to perform extraction through the magnetic field communication (step S2).

The control means 22 verifies whether the specific information such as the ID information extracted by the non-contact reader 20 matches any one of the first comparison information, second comparison information and third comparison information (step S3). If the ID information matches any one of the first comparison information, second comparison information and third comparison information (YES in step S3), the control means 22 allows the electric power circuit 8 to supply the power from the charge stand 40 to the battery cell 32 of the secondary battery 30, allowing the start of supplying the power (step 4).

If the ID information does not match any one of the first comparison information, second comparison information and third comparison information (NO in step S3), the control means 22 causes the communication means 4 to be communicably connected with the server 54 of the communication network 52 (see FIG. 1). In case the communication means 4 fails to establish communication connection with the server 54 (YES in step S5), the control means 22 prevents the electric power circuit 8 from supplying the power to the battery cell 32 (step S6). In addition, the control means 22 causes the display means 16 or the speaker 12 to notify a user of "No power supply due to the failure of authentication" (step S7).

If the communication means 4 succeeds in establishing communication connection with the server 54 (NO in step S5), the control means 22 causes the communication means 4 to transmit the specific information such as the ID information of the secondary battery 30 and the personal information related to the maker and model names of the cellar phone 2 stored in the storage means 6 shown in FIG. 2 to the server 54. The control means 22 inquires the server 54 whether the cellar phone 2 and the secondary battery 30 are compatible with each other (step S8).

If the server 54 receives the specific information such as the ID information of the secondary battery 30 and the information related to the maker and model names of the cellar phone 2 (step S9), the server 54 investigate whether a combination matching the received information is recorded in the table of correspondence for secondary batteries shown in FIG. 3 (step S10).

If the matching combination is recorded in the table of correspondence for secondary batteries, the server 54 transmits the result of judgment, "the cellar phone 2 and the secondary battery 30 are compatible with each other" to the cellar phone 2 (step S11). If the matching combination is not recorded in the table of correspondence for secondary batteries, the server 54 transmits the result of judgment, "incompatible" to the cellar phone 2 (also step S11). If a new program related to the charging control for each model of secondary battery is updated on the server 54, the control means 22 may allow the cellar phone 2 to download this control program.

If the control means 22 of the cellar phone 2 receives the result of judgment given by the server 54 and the new program through the communication means 4 (step S12), the control means 22 verifies the result of judgment (step S13).

If the result of judgment given by the server 54 is "the cellar phone 2 and the secondary battery 36 are compatible with each other," the control means 22 authenticates charging of the secondary battery 30 (YES in step S13). Subsequently, the control means 22 allows the electric power circuit 8 to supply the power from the charge stand 40 to the battery cell 32 of the secondary battery 30, starting the power supply (step S14). The control means 22 not only deletes the third comparison information stored in the second storage means 6b shown in FIG. 2, but also allows the specific information such as the ID information of the secondary battery 30 extracted in step S2 as shown in FIG. 2 to be stored as a new third comparison information (step S15). In addition, if a new charge control program has been downloaded at the time of starting power supply, the control means 22 performs charge control in accordance with the new charge control program. In this manner, it is possible to increase the efficiency and safety without making a user feel burdensome.

If the result of judgment given by the server 54 is "the cellar phone 2 and the secondary battery 36 are not compatible with each other," the control means 22 inhibits charging of the secondary battery 30 (NO in step S13). Accordingly, the power is not supplied to the electric power circuit 8 (step S16). Subsequently, the control means 22 causes the display means 16 or the speaker 12 to notify the user of "No power supply due to the secondary battery 30 being likely to be an irregular product or imitation" (step S17).

With the cellar phone 2 and the secondary battery 30, the cellar phone 2 compares the comparison information with the specific information such as the ID information of the secondary battery 30 so as to verify the compatibility with each other. For a case where the cellar phone 2 installed with an incompatible secondary battery 30 is connected with the charge stand 40, it is possible to inhibit charging of the secondary battery 30, thereby decrease the possibility of the cellar phone 2 or the secondary battery 30 to have damage due to charging.

In addition, even if the third comparison information of the second storage means 6b is stored as consistent with the specific information such as the ID information of the secondary battery 30 installed in the cellar phone 2, the third comparison information is deleted if this secondary battery 30 is removed. Since the third comparison information before its deletion will not have an effect on a secondary battery to be subsequently installed, it is possible to increase the reliability of authentication.

Furthermore, the cellar phone 2 is provided with the non-contact reader 20 and the secondary battery 30 is provided with the non-contact output means 36, respectively. This enables the wireless (magnetic field) communication utilizing the RFID technique. Accordingly, although the non-contact output means 36 is installed inside the secondary battery 30, the non-contact output means 36 can operate even if the battery cell 32 of the secondary battery 30 has a small amount of remaining capacity.

As described above, it is possible to determine the model of a battery so as to perform safe charging. In addition, since the loop antennas can be placed close to each other, it is possible to perform non-contact communication efficiently in terms of spatial and power efficiency.

It is possible to render the non-contact communication to be less susceptible to noises, while restraining the transmission power of the non-contact communication.

In addition, it is possible to downsize the battery terminal and the secondary battery that are used for mobile electronic devices.

Similarly, it is possible to increase the productivity of the secondary battery to be installed in such mobile electronic devices.

While the invention has been described with reference to an example in which the invention is applied to the cellar phone, it will be apparent that the invention can also be applied to various mobile electronic devices, such as a PDA (Personal Digital Assistant), mobile navigation device and gaming machine, and various battery terminals and secondary batteries that are used for such mobile electronic devices.

The invention claimed is:

1. A charge system comprising:
a secondary battery attachably and detachably installed;
a mobile electronic device to which electric power is supplied by the secondary battery; and
a charging device charging the secondary battery via the mobile electronic device,
wherein the secondary battery comprises:
a battery cell accumulating electric power;
an electrode connected to the battery cell; and
non-contact output means capable of outputting specific information by magnetic field communication,
wherein the mobile electronic device comprises:
a battery terminal transferring electric power with the electrode of the secondary battery;
non-contact means for extracting information that performs magnetic field communication with the non-contact output means; and
a control means that acquires the specific information outputted by the non-contact means for extracting information and controls charging of the secondary battery based on the acquired specific information while the charging device is connected with the mobile electronic device,
wherein the non-contact means for extracting information has a loop antenna for performing transmission and reception of signals through electromagnetic waves, and
wherein the loop antenna is placed within the battery terminal, the electrode is fixed at an end portion of the battery cell, and the non-contact output means is fixed at the end portion of the battery cell at which the electrode is fixed.

2. A mobile electronic device that is supplied with electric power by a secondary battery attachably and detachably installed, comprising:
a battery terminal transferring electric power with the installed secondary battery;
non-contact means for extracting information performing magnetic field communication;
a loop antenna with which the non-contact means for extracting information performs transmission and reception of signals through electromagnetic waves; and
control means for acquiring specific information outputted by the non-contact means for extracting information and controlling charging of the secondary battery based on the acquired specific information,
wherein the loop antenna is placed within the battery terminal.

3. The mobile electronic device according to claim 2, wherein the battery terminal comprises:
a plurality of terminals abutting electrodes of the secondary battery; and
a main body that holds the plurality of terminals to be urged in a predetermined direction, and
wherein the loop antenna is fixed to the main body such that an axial direction of winding of the loop antenna is in parallel with the predetermined direction.

4. A secondary battery supplying electric power while installed in a mobile electronic device that comprises a non-contact means for extracting information that performs magnetic field communication, the secondary battery comprising:
a battery cell accumulating electric power;
a positive terminal and a negative terminal connected to the battery cell;
storage means storing information related to particularly identifying the secondary battery; and
non-contact output means capable of outputting the information stored in the storage means,
wherein the non-contact output means comprises a loop antenna for performing magnetic field communication,
wherein the positive terminal and the negative terminal are fixed to the battery cell so as to be exposed at a predetermined surface of the battery cell,
wherein the non-contact output means and the storage means are fixed to the battery cell such that an axial direction of winding of the loop antenna is perpendicular to the predetermined surface, and
wherein a magnetic sheet is interposed between the non-contact output means and the battery cell.

5. The secondary battery according to claim 4, further comprising:
protection means that is interposed between the battery cell and the positive terminal and the negative terminal so as to protect the battery cell from an over current,
wherein the positive terminal, the negative terminal, the non-contact output means, and the storage means are integrally fixed to the battery cell by resin molding.

6. A secondary battery supplying electric power while installed in a mobile electronic device that comprises a non-contact means for extracting information that performs magnetic field communication, the secondary battery comprising:
a battery cell accumulating electric power;
a positive terminal and a negative terminal connected to the battery cell;
storage means storing information related to particularly identifying the secondary battery; and non-contact output means capable of outputting the information stored in the storage means, wherein the non-contact output means comprises a loop antenna for performing magnetic field communication, wherein the positive terminal and the negative terminal are fixed to the battery cell so as to be exposed at a predetermined surface of the battery cell, wherein the non-contact output means and the storage means are fixed to the battery cell such that an axial direction of winding of the loop antenna is perpendicular to the predetermined surface, and wherein the non-contact output means and the storage means are fixed to the battery cell by adhesion with a seal for detecting a water content.

7. The secondary battery according to claim 4, further comprising protection means that is interposed between the battery cell and the positive terminal and the negative terminal so as to protect the battery cell from an over current, wherein the positive terminal, the negative terminal, the non-contact output means, and the storage means are integrally fixed to the battery cell by resin molding.

8. The secondary battery according to claim 4, wherein the non-contact output means and the storage means are fixed to the battery cell by adhesion with a seal for detecting a water content.

9. The charge system of claim 1, wherein the loop antenna of the non-contact means for extracting information is a first loop antenna, wherein the non-contact output means capable of outputting specific information has a second loop antenna for performing transmission and reception of signals through electromagnetic waves, and wherein, when the first loop antenna is placed within the battery terminal, the first loop antenna has an axial direction that is coaxial with an axial direction of the second loop antenna.

10. The charge system of claim 9, wherein the control means of the mobile electronic device is configured to turn on electricity to the first loop antenna to generate a magnetic field that induces an electromotive force on the second loop antenna.

11. The mobile electronic device of claim 2, wherein the control means is configured to turn on electricity to the loop antenna to generate a magnetic field that induces an electromotive force.

\* \* \* \* \*